United States Patent [19]

Oder et al.

[11] Patent Number: 5,475,594

[45] Date of Patent: Dec. 12, 1995

[54] METHOD AND DEVICE FOR ASSISTING THE PILOTING OF AN AIRCRAFT FROM A VOLUMINOUS SET OF MEMORY-STORED DOCUMENTS

[75] Inventors: Engin Oder, Voisins Le Bretonneux; Francine Pierre, Paris; Jean-Marie Renouard, Saint Cloud, all of France

[73] Assignee: Sextant Avionique, Meudon La Foret, France

[21] Appl. No.: 95,710

[22] Filed: Jul. 23, 1993

[30] Foreign Application Priority Data

Jul. 24, 1992 [FR] France .................................. 92 09414
Jul. 24, 1992 [FR] France .................................. 92 09415

[51] Int. Cl.$^6$ .............................. G06F 17/30; G06F 3/14
[52] U.S. Cl. ..................... 364/424.06; 340/971; 395/161
[58] Field of Search .............................. 364/424.06, 443, 364/444; 340/971; 395/600, 155, 156, 160, 161

[56] References Cited

U.S. PATENT DOCUMENTS

| | | | |
|---|---|---|---|
| 4,220,994 | 9/1980 | Hendrickson | 364/450 |
| 4,725,694 | 2/1988 | Auer et al. | 178/18 |
| 4,845,495 | 7/1989 | Bollard et al. | 340/973 |
| 4,853,888 | 8/1989 | Lata et al. | 364/900 |
| 5,045,880 | 9/1991 | Evanitsky et al. | 355/200 |
| 5,267,147 | 11/1993 | Harshaw et al. | 364/401 |

FOREIGN PATENT DOCUMENTS

| | | |
|---|---|---|
| 0246021 | 11/1987 | European Pat. Off. . |
| 3628333 | 3/1988 | European Pat. Off. . |
| 0413449 | 2/1991 | European Pat. Off. . |
| 0470837 | 2/1992 | European Pat. Off. . |

OTHER PUBLICATIONS

Larry J. Bowe: "Flight-Management System Control Display Technology in New-Generation Transport Aircraft"; pp. 307–312, May 9–12, 1982; IEEE US; First Annual Phoenix Conference on Computers and Communications.

Autotestcon 90 17 Sep. 1990, San Antonio, Texas; pp. 549–556; Balke et al: "V-22 Mechanical Diagnostic design approach".

Primary Examiner—Michael Zanelli
Attorney, Agent, or Firm—Browdy and Neimark

[57] ABSTRACT

A method for assisting the piloting of an aircraft from a voluminous set of memory-stored documents which uses a processor associated with a terminal comprising a screen and control and data entry keys and with memories containing useful information for operating a flight, the processor being connected to other items of equipment of the aerodyne. The method comprises storing of information in a data base and supplying first exploitation functions of this information, real-time acquisition by the processor of an event relative to the current situation of the aerodyne and analyzing the new situation generated by the occurrence of this event, preselecting the information in the data base best adapted to the new situation, and classifying same by order of relevance, supplying second exploitation functions of the preselected information, selection and exploitation, by the operator, of one of the exploitation functions. The method applies in particular to the civil and commercial aviation.

25 Claims, 9 Drawing Sheets

METHOD AND DEVICE FOR ASSISTING THE PILOTING OF AN AIRCRAFT FROM A VOLUMINOUS SET OF MEMORY-STORED DOCUMENTS

FIELD OF THE INVENTION

The present invention concerns a method and a device for assisting the piloting of an aerodyne from a large amount of information stored in a memory in which the information appears in the form of documents containing both texts and images.

BACKGROUND OF THE INVENTION

It is applicable in particular, but not exclusively, to civil and commercial aviation where, so as to cope with the large increase of air traffic whilst increasing the level of safety, a large number of increasingly complex and restrictive procedures and rules have been set up, both as regards each airline company and each airport. These procedures, which currently govern all the stages of a flight, are described in printed manuals able to be consulted by steering personnel at any given time.

At the current moment, this documentation is only available in printed form, represents a weight or about severals tens of kgs and is difficult to gain access to and sort out, especially on board an aircraft where the available space is relatively limited. This information concerns, for example, the various procedures to be followed during each flight stage, the data required for controlling a flight and the monitoring of the various devices of aerodynes. They originate from diverse sources, especially from aerodyne manufacturers, equipment producers, suppliers of navigation maps or even from airline companies.

For a particular situation of an aerodyne, all the information available is not strictly necessary and, the more bulky this documentation is, the longer and more difficult it is to seek out information, a situation scarcely compatible with aviation requirements.

SUMMARY OF THE INVENTION

The aim of the invention is to resolve these drawbacks and to this effect offers a method for assisting the piloting of an aerodyne implemented by a system including a processor, at least one man/machine communication terminal comprising a display screen and control and data entry keys, and memories in which in particular all the information useful for operating a flight is stored, and in particular, all the information required to conduct a flight in accordance with air regulations, the system being connected to the other electronic equipment embarked on board the aerodyne. This method is characterized in that it includes the following stages:

the entering and storing in the memories of said information in the form of a data base and, by means of the terminal, providing the operator with first means for exploiting this information;

the real time acquisition by the processor of at least one event relating to the current situation of the aerodyne and analysis of the new situation generated by the arrival of this event in the context where the aerodyne is located;

the preselection by the processor of the data base information best adapted to the new situation and their classification by order of relevancy with respect to this situation;

the terminal providing the operator with second means for processing the preselected and classified information;

the operator selecting one of said processing means and one portion of the preselected information, and the operator exploiting on the display screen the portion of the selected information with the aid of the selected processing device.

The computer system implemented by the method is thus intended to complete existing on board computers by effectively placing at the disposal of the aircrew all the information useful for conducting the flight. This effectiveness is obtained by virtue of the preselection of information according to the context in which the aircraft is located and by means of the processing means provided by the system. This preselection is able to provide the operator with simplified fast access to the information concerned.

Furthermore, current piloting techniques call upon a large number of lists of tasks (actions - checks) informing the crew members of what tasks are to be carried out and in what order so as to enable them to act quickly and appropriately, irrespective of the situation of the aircraft, that is normal or abnormal.

These tasks are featured in printed documents in which each list is marked by a title and includes a series of wordings which each succinctly indicate a task to be carried out.

A detailed commentary corresponds to each of these lists and is featured in another document. This commentary more particularly relates to the list in general and its conditions of use, as well as to the particular features of each of the tasks of the list.

Generally speaking, the use of lists of tasks in the form of printed documents does not guarantee that all the tasks as listed have been completed, even more so when these lists are long and are sometimes interrupted by the need to carry out some other task.

Advantageously, these lists of tasks form part of the data base of the system and are thus likely to be preselected and classified. In order for these lists of tasks to be processed appropriately, the processing means implement the following stages:

following an order by the operator, the displaying on the screen of the terminal of the list of tasks preselected by the system according to the current situation of the aerodyne;

the activation of a key making it possible to position a marker which designates the first task of the list to be carried out, thus provoking the launching of processing of the list, and the movement of said marker from one task to another following activation of a key of said terminal by the operator in order to validate the task designated by said marker when the said task has been executed and in order to have the marker designate the next task to be carried out.

According to one particular characteristic of the invention, the processing means include means to gain access to the various types of information stored in the data base in the same way as a library containing books. These means implement the following stages:

the sequential consultation of a set of information page by page;

the display on the screen of the contents and index tables of keywords in the form of menus whereby the operator is able to make a selection in order to gain instant access to the corresponding information, and the activation of reference links between one first set of information the operator consults on the screen and other sets of information, thus offering the operator the possibility of returning to the set of information where the start point of the link is located.

According to another particular characteristic of the invention, the processing means also include means to store when ordered by the operator the page displayed in an easily and quickly accessible space provided to this effect.

This memory space rendered accessible by a terminal thus enables the pilot in particular to collate during the flight preparation stage all the pages he frequently needs to consult rapidly, especially during the manoeuvring phases.

Thus, the invention offers a device for speedily and easily processing a large volume of information and is perfectly adapted to the tasks of seeking information when piloting a commercial airplane.

BRIEF DESCRIPTION OF THE DRAWINGS

One non-restrictive example of an implementation of the method of the invention shall now be described hereafter with reference to the accompanying drawings on which.

DETAILED DESCRIPTION OF THE PREFERRED EMBODIMENTS

Figure 1:
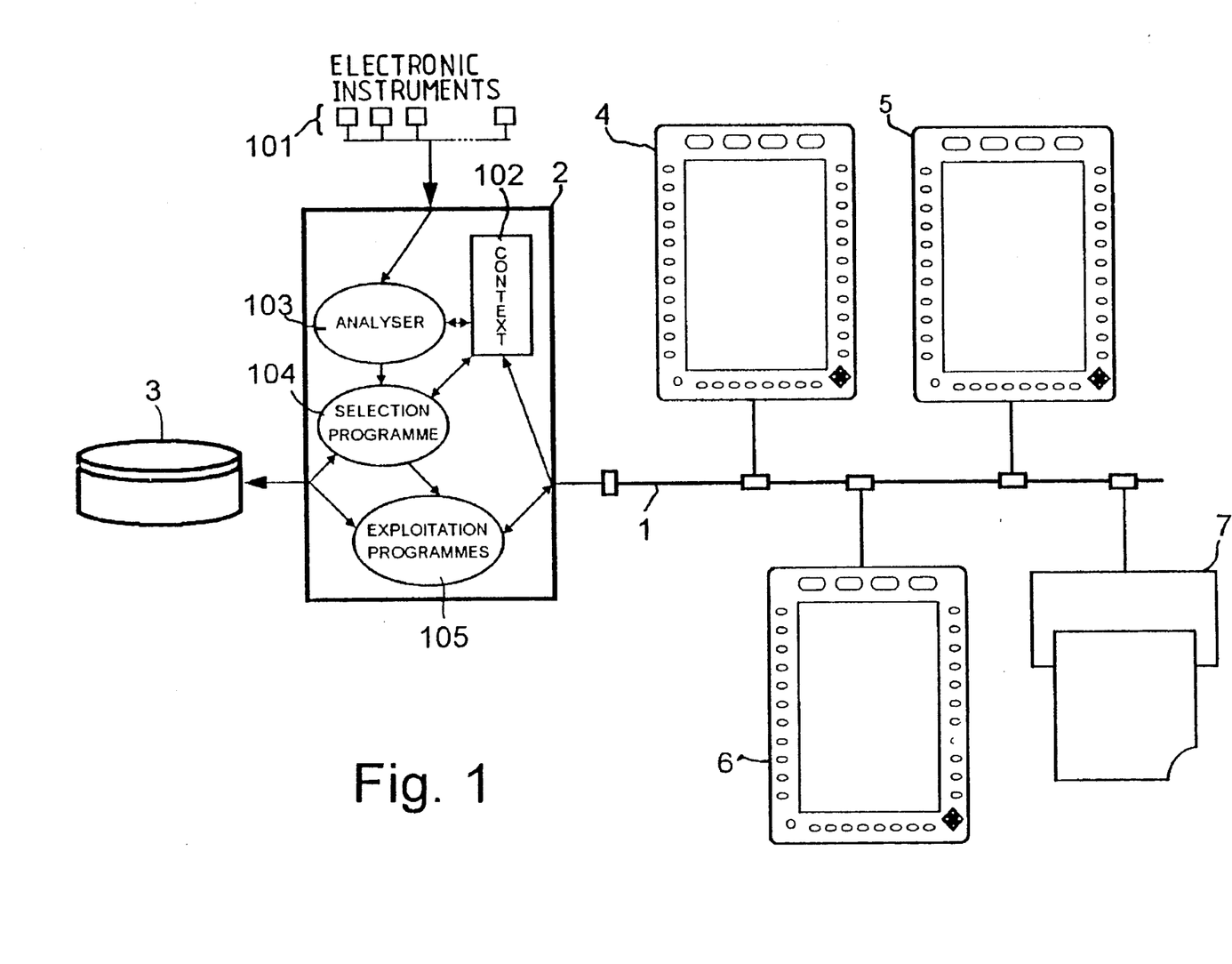
FIG. 1 is a diagram of the architecture of the information processing system embarked on board the aerodyne.

The diagram appearing on FIG. 1 shows an example of the architecture of an information processing system intended to be embarked on board a commercial aircraft and implementing the method for assisting the piloting of an aerodyne.

This system is formed of a local network 1 to which the following are connected:

a central processing unit 2 managing access to the local network and to the bulk memory 3 possibly formed of several magnetic, optical or magneto-optical disk units, communication terminals 4, 5, 6 adapted to usage on board a commercial aircraft and in particular inside the pilot's cockpit where the available space is relatively small, and a printer 7 offering the operator the possibility of printing the page displayed on the screen.

The central processing unit is connected by means of buses of the aircraft to the embarked set 101 of sensors and electronic systems so as to acquire in real time the data available on the other items of equipment on board.

The bulk memory 3 is able to store in a data base form all the information normally existing in the form of printed matter in the pilot's cockpit of a commercial aircraft. For example, this information concerns:

the flight manuals, the documentation associated with each airport of the traversed geographical zone and including in particular the description of the take-off and landing procedures, the navigation maps and manuals of the traversed geographical zone, . . . and for each type of aircraft:

the operational manual, the minimum equipment description manual, and the maintenance manual.

This information is supplied according to different formats (ASCII files, digitalized images, books) and different media (data processing, paper). It is then converted according to standard formats (SGML for texts, CGM for vectorized images, and CCITT/G4 for images with the bitmap format) so as to be integrated into a data base situated on the ground from which data bases are extracted adapted to the various types of aircraft.

Before being embarked so as to be stored in the bulk memory 3, these data bases are converted according to a predetermined format. The embarked data bases are completed by an "application" data base which lists together the various exploitation programs 105 of the data stored in these bases. These programs are designed to facilitate piloting tasks and help the crew to resolve any problems the latter may encounter.

These programs 105 constitute the translation into a data processing language of the various scenarios according to which the types of information are to be processed and chained with one another.

In particular, they define for each processing stage:

the information to be exhibited on the screen, the way information is presented, the active keys of the terminal and their respective functions, that is the respective programs to be executed.

The central processing unit 2 implements a program 103 known as an "analyzer" program which is activated upon the arrival of an original event, either from the environment 101 of the system or from one of the terminals 4,5,6 generated by an operator when he presses a key. The aim of this program is to analyse the events occurring so as to manage a set of variables which define the real time context 102 in which the aircraft is located. With the aim of finely analysing complex situations, it may be conceived according to an expert system comprising a knowledge base, a rule base and an inference engine.

The variables of the real time context 102 concern more particularly:

the description of the current flight (departure airport, destination and alternate airport, route), the current flight phase, the situation of the aircraft (position, altitude, speed), any detected malfunctions, . . .

On each modification of the real time context 102, the analyser 103 triggers a selection program 104 which, according to the real time context 102, establishes the dedicated linkages between the data base information best adapted to the needs of the crew resulting from the new real time context 102 and the processing programs 105.

When an operator triggers a processing program 105 by activating a function key of a terminal 4,5,6, the processing program thus selected uses these dedicated linkages so as to priority-process the information best adapted to the real time context of the aircraft. Of course, the operator still has the possibility of gaining access to the other information contained in the data base.

So as to gain access to the data base, the selection 104 and processing 105 programs call upon the functions of a data base management system which may be of a standard type.

Figure 2:
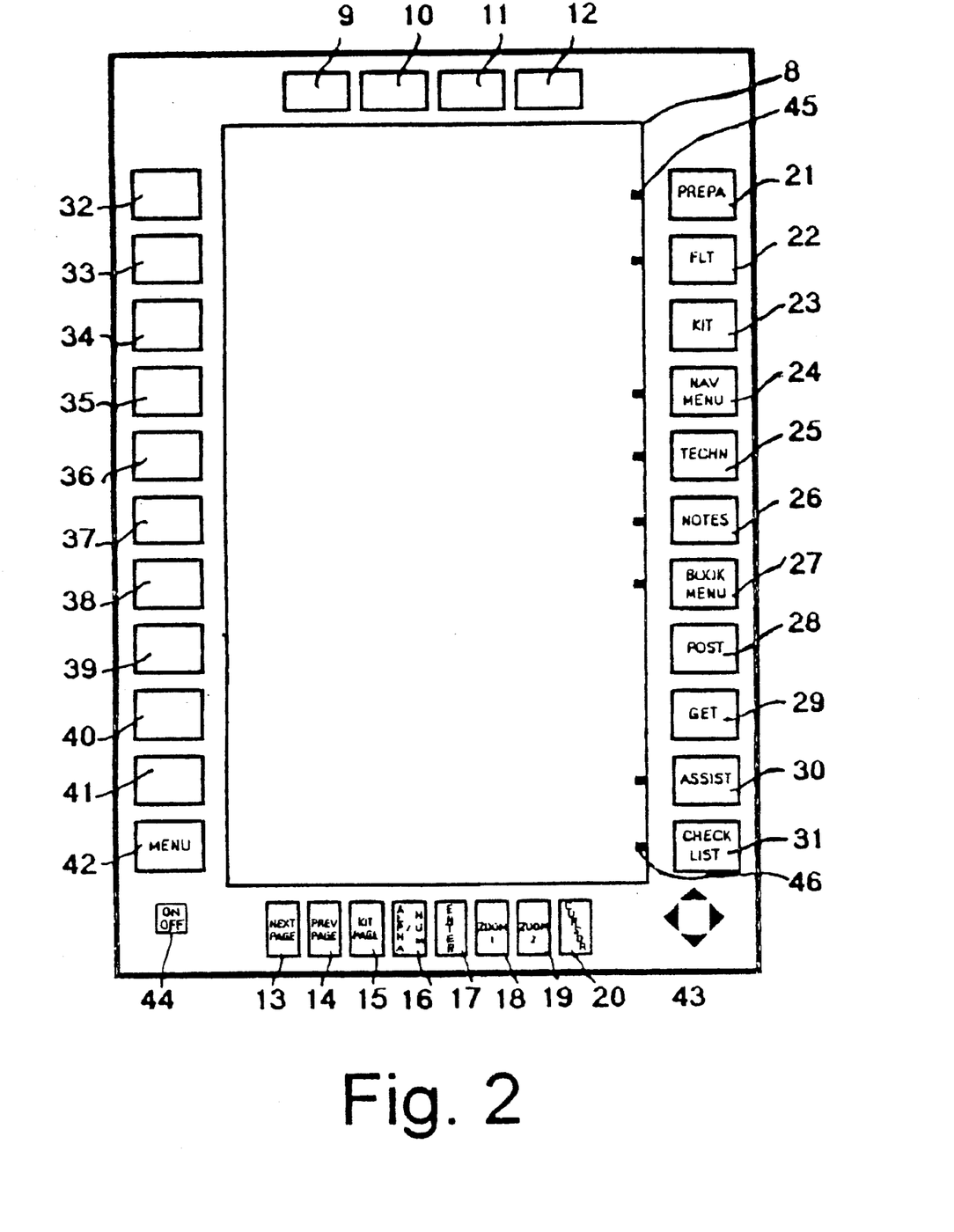
FIG. 2 diagrammatically shows a communication terminal.

On FIG. 2, each of the communication terminals 4,5,6 is constituted by a rectangular display screen 8 around which the keys are distributed.

Certain keys have a predetermined function and in this case, the wording of the function is featured on the key. However, these keys may be reconfigured according to the page displayed on the screen, either to activate other functions or to enter chains of characters. In this case, the name of the function allocated to each key or the corresponding character is indicated on the screen close to the key or on the key itself.

Each key may assume two or three states:

a nonactivable state when the key is not allocated to any function, an activatable state when the key is able to activate a function, and an active state when the predetermined function associated with the key is being executed.

Close to each key having a predetermined function, there is a state indicator 45, 46 (shown by a square on the figures) which when lit up indicates that the key is active (in white on the figures) or activatable (in black) depending on the color of the lit up indicator and which, when out (invisible on the figures), indicates that the key is nonactivable.

Those keys not allocated to a predetermined function may be activatable if a function wording is featured on the screen, close to the key or, if not, be nonactivatable.

The keys of the righthand column 21 to 31 are allocated to the triggering of exploitation programs 105, as for example "PREPA" 21 for initializing a flight or "CHECK LIST" 31 for piloting assistance.

The keys 32 to 41 of the lefthand column generally make it possible to proceed with selections when menus are displayed on the screen. The last key of the left column entitled "MENU" 42 makes it possible to display the last menu which has allowed access to be gained to the current page. This key may be activated several times in a row. In this case, the various menus chained to gain access to the current page are successively displayed up to the first menu of the corresponding main function.

The keys 13 to 20 of the row below the screen make it possible to activate the functions linked to management of the terminal, as for example "ENTER" 17 to validate a selection or an entry, or "CURSOR" 20 to display and activate a cursor.

The four keys 9 to 12 located above the screen indicate consecutively the names of the four last tasks carried out by the operator. Contrarily to the "MENU" key 42, these tasks may correspond to different main functions.

Thus, the terminal offers two different possibilities for scrolling up a chaining of selections made by the operator: the keys 9 to 12 situated above the screen make it possible to chronologically scroll up this chaining by granting access to the last three sequences used, whereas the key "MENU" 42 makes it possible to scroll up a menu chaining tree structure.

Figure 3:
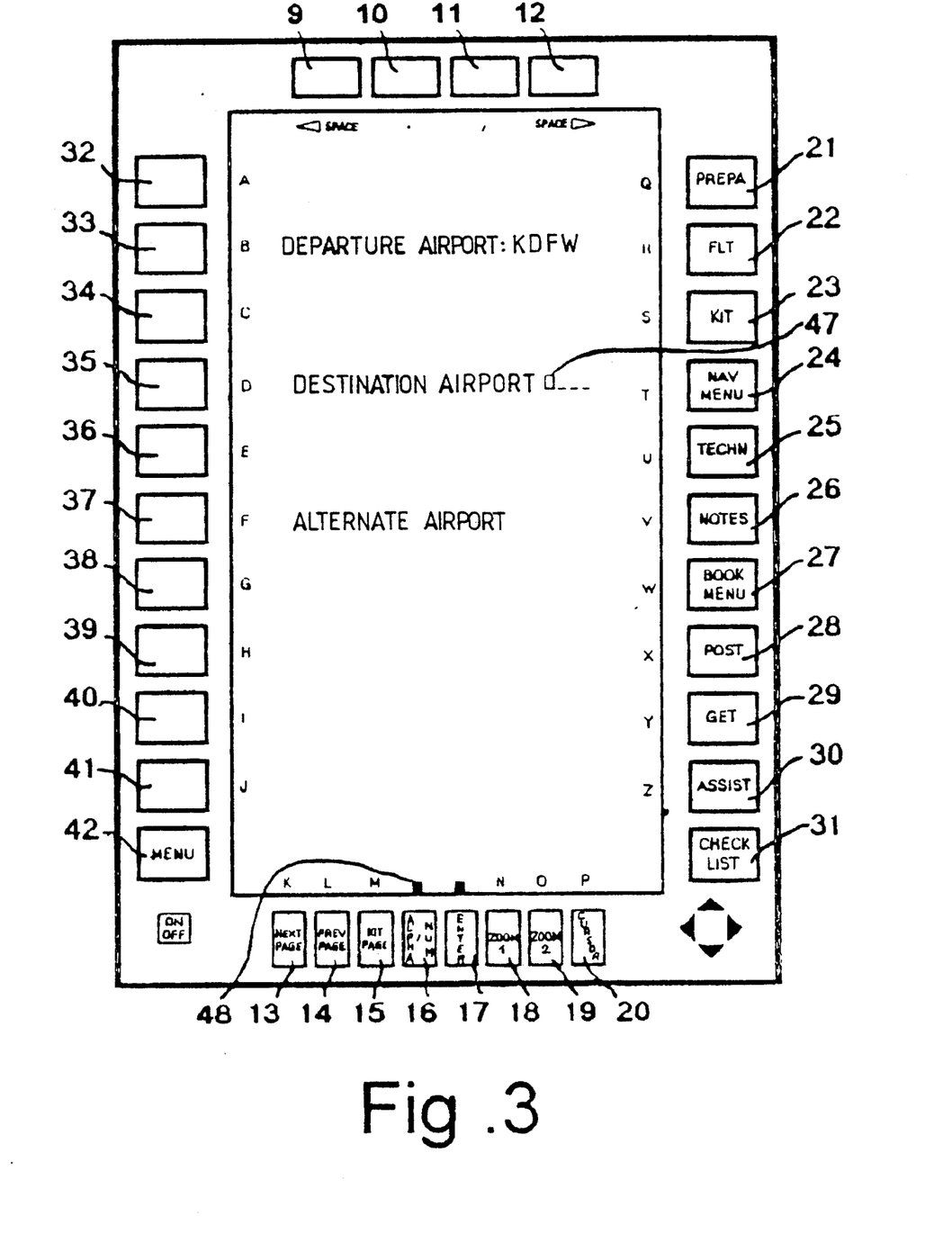
FIGS. 3 to 9 diagrammatically show different screens chained by examples of means for processing the information stored in the data base.

One of the exploitation programs makes it possible to control the initialization phase of a flight, the aim of this program being in particular to initialize the context of the flight. This program is activated by means of the key "PREPA" 21. This key is able to trigger the display of the screen shown on FIG. 3 on which the departure airport code appears ("DEPARTURE AIRPORT: K D F W") theoretically already known to the system since it corresponds to the destination airport of the preceding flight. The line displayed below makes it possible to enter the destination airport code in a maximum of four letters:

"DESTINATION AIRPORT: "- - - -".

A cursor 47 flashes on the first character to be entered in. This entry is required to define a flight as it makes it possible to define, along with the reference of the departure airport, the trajectory of the flight to be followed. On this screen, most of the keys are reconfigured so that each of them corresponds to one character of the alphabet, thus enabling the operator to key-in this code. To this effect, the character corresponding to each key appears on the display screen close to the key. The key "ALPHA/NUM" 16 appears as activatable, a black square 48 being displayed by the side of the key. This key makes it possible to reconfigure the keys so as to be able to key-in figures. This key 16 acts in the way of a see-saw for moving from one alphabetical entry mode to a digital entry mode and vice versa.

In these entry modes, the activation of the key "ENTER" 17, which appears activatable, makes it possible to validate the entry. Once the entry is validated by the key "ENTER", the system shall look in its memory to see if the airport code entered exists. If it does not exist, an error message is displayed by the system and the cursor is positioned on the first character to be keyed in. If it does exist, the cursor moves to the field to be entered next which concerns the alternate airport:

"ALTERNATE AIRPORT: - - - -".

This entry is optional and when the operator has pressed the key "ENTER" 17, the central processing unit 2 suppresses the allocation of keys to the entry and renders activable the three keys 33,35,37 of the lefthand column situated at the level of the three lines where the flight airport codes selected are displayed. These keys make it possible to select an airport so as to display the documentation concerning said airport.

As the flight preparation function is being processed, the indicator 45 associated with the key "PREPA" 21 shows that the key is active. In addition, the key 41 entitled "MODIFY AN AIRPORT", also rendered activatable, makes it possible in an analog way to modify the entry previously made.

As mentioned previously, the system is connected to the other items of the electronic equipment of the aircraft so as to detect in particular the take-off of the aircraft and thus prohibit modifying the departure airport after take-off.

If one of the keys 31,33,35 is activated to select an airport, a list of documents concerning the airport thus designated appears on the screen in association with the keys 32 to 41 of the lefthand column. These documents are selected from the documentation stored in the data base according to the type of airport, that is the departure, destination or alternate airport. Thus, for example, the arrival instructions are not necessary when the operator asks for the documentation of the departure airport. On the other hand, the key 9 takes the designation of the selected sequence. It is entitled for example as the "DEPARTURE AIRPORT" if the operator has activated the "departure" sequence with the aim of consulting the documentation concerning the departure airport.

So as to select a document, it suffices to merely press the key of the lefthand column situated at the level of the line where the title of the document is displayed. From this moment, the first page of the selected document is displayed on the screen and the wording of the first key 9 of the line situated above the screen corresponds to the title of the selected document, whereas the second key 10 takes the wording the key 9 had before the operator has selected a document, that is for example the "DEPARTURE AIRPORT". By pressing on this last key 10, the operator is able to again display the list of documents concerning the selected airport so as to display another document.

The operator can also fully display the document he has selected by means of the keys "NEXT PAGE" 13 and "PREV PAGE" 14 which enable him to respectively display the following and preceding pages, the various pages of a document being shown by order of importance in the context of the current flight.

At this stage, the preparation of the flight consists of selecting a set of important pages so as to memorize them and thus be able to gain fast access page by page by means of a single key. To this effect, the information processing system described earlier also includes a memory space enabling the operator to store screen pages.

This memory space includes four subdivisions corresponding to various requirements, the first three being respectively allocated to the airports of the flight, namely:

the "departure" subdivision concerning the departure airport, the "destination" subdivision concerning the destination airport, the "alternate" subdivision concerning the alternate airport, the "free" subdivision concerning all the other documents.

All these subdivisions are unique, even if the system comprises several terminals, except for the "free" subdivision which is specific to each terminal. In this way, the information stored in the subdivisions concerning the airports of the flight is accessible by all the terminals of the system, whereas each terminal has its own "free" subdivision to which it is the only one to have access.

The insertion function key of a page in this memory space is solely activatable when the page displayed may be inserted in one of these subdivisions. Only the first three subdivisions are structured according to the documentation associated with the flight airports.

Any page may be inserted in the "free" subdivision, except for pages corresponding to the first three subdivisions.

Conversely, only the pages corresponding to an airport of the flight can be inserted into one of the first three subvdivisions.

So as to record a page displayed on the screen in one of these subdivisions, it suffices to merely press the key "KIT PAGE" 15 and the system determines in what subdivision the page is to be memorized according to the current sequence, provided the key in question is activatable. For example, if the pilot has activated the sequence "departure" to display the current page and if he presses the activatable key "KIT PAGE" 15, the current page is stored in the "departure" subdivision. During the two seconds following activation of the key, the next message is displayed at the bottom of the screen so as to inform the operator that his order has been properly taken into account: "PAGE 1 STORED IN THE DEPARTURE KIT" if this concerns the first page stored in the "departure" subdivision.

So as to prevent the operator from twice inserting the same page in a subdivision, the function of the key "KIT PAGE" 15 is reconfigured into "REMOVE KIT PAGE" 54 so as to suppress the page which has just been inserted. This key 15 shall reassume its "KIT PAGE" main function for page storage during the displaying of a page which has not already been stored in a subdivision.

If the key "KIT PAGE" 15 is activatable and none of the three sequences corresponding to the first three subdivisions allocated to the airports of the flight is active, the current page shall be stored in the "free" subdivision.

There is no limit to the number of pages stored in a subdivision, but the higher this number is, the less is the advantage of this function as it shall then pose a problem for selecting the sought-after page.

The pages are automatically sequenced in the subdivisions according to their importance which is defined as regards the order in which the documents and pages inside a document are classified in the data base.

So as to gain access to one of these subdivisions, it merely suffices to press the key "KIT" 23 situated in the righthand column of the screen. If only a single subdivision has been filled, access can be effected directly to this subdivision. Otherwise, that is if at least two subdivisions are filled, a menu having available subdivisions associated with one portion of the keys 32 to 41 of the lefthand column enables a subdivision to be selected.

When the key "KIT" 23 is pressed and at least one page has been stored in a subdivision, the indicator 55 associated with this key 23 is in the active state.

The choice of a subdivision from the selection menu causes the displaying of either the page of the previously displayed subdivision or the first page of the subdivision if it has never been consulted. When a subdivision has been selected, the various pages stored there may be displayed by means of the key "NEXT PAGE" 13 so as to move to the next page, and the key "PREV. PAGE" 14 to move to the preceding page. If the first page of a subdivision is displayed, only the key "NEXT PAGE" 13 is active. Similarly, if the last page of a subdivision is displayed, only the key "PREV. PAGE" 14 is active.

Figure 4:
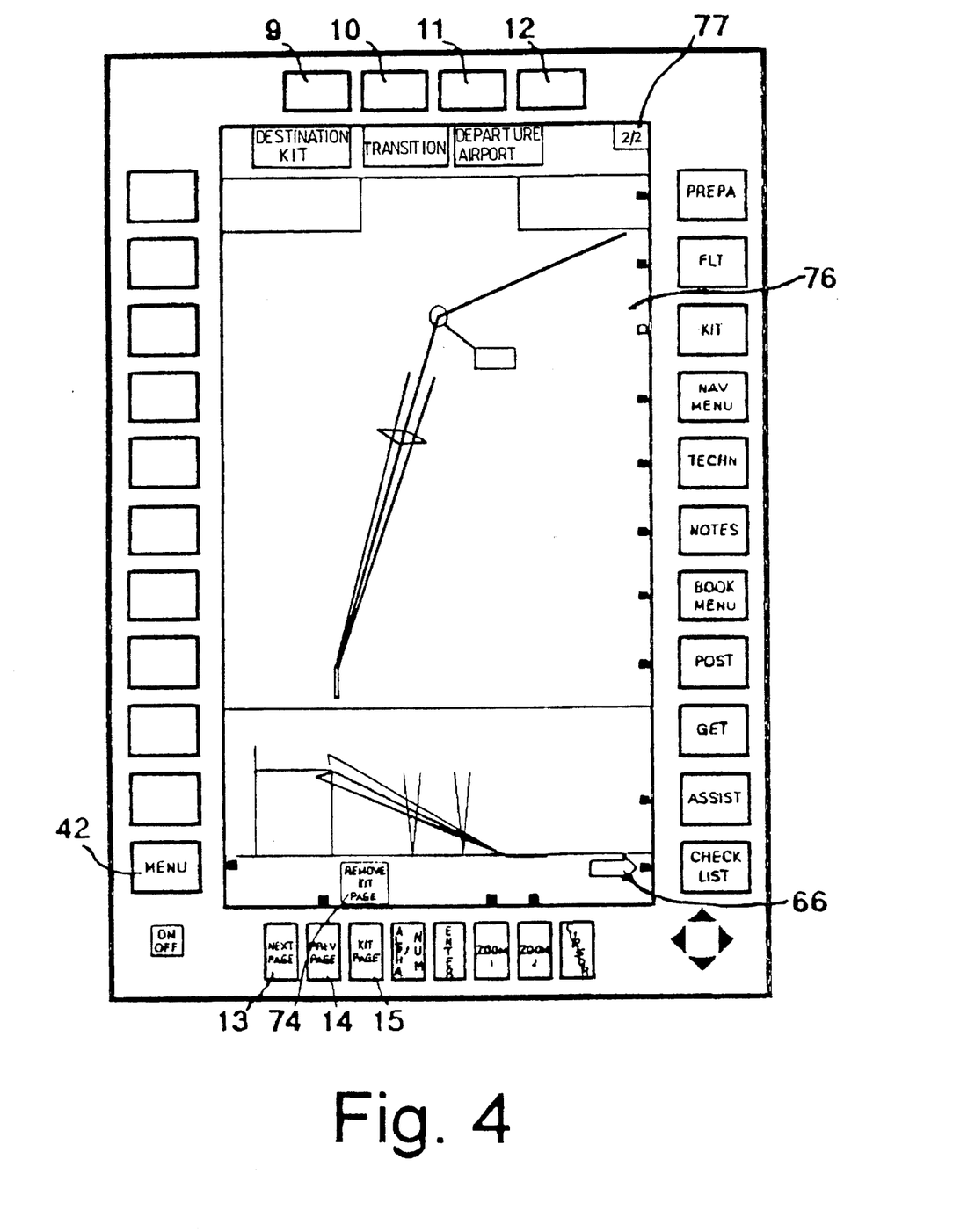

FIG. 4 represents a screen obtained by displaying an approach map 76 stored in the destination subdivison as indicated by the key 9 entitled "DESTINATION KIT". The wordings of the keys 10 "TRANSITION" and 11 "DEPARTURE AIRPORT" indicate that the document entitled "TRANSITION" is being displayed concerning the departure airport at the moment the subdivision "destination" has been requested to be consulted. The key 10 makes it possible to display the page which was displayed when the operator has activated the key "KIT" 23, that is a page of the document entitled "TRANSITIONS" associated with the departure airport. The key 11 allows for gaining access again to the selection menu of an airport.

Moreover, the number of the page in the subdivision is displayed in the upper righthand corner of the screen and the number of pages stored in the subdivision "2/2" 77 indicates that the subdivision contains two stored pages and the page displayed is the second page.

When a page of a subdivision (FIG. 4) is displayed, it is also possible to delete it from the subdivision by pressing the key "KIT PAGE" 15 reconfigured into "REMOVE KIT PAGE" 74. In this screen, if the activatable key "MENU" 42 is pressed, the selection menu of the subdivisions used appears overprinted.

Figure 5:
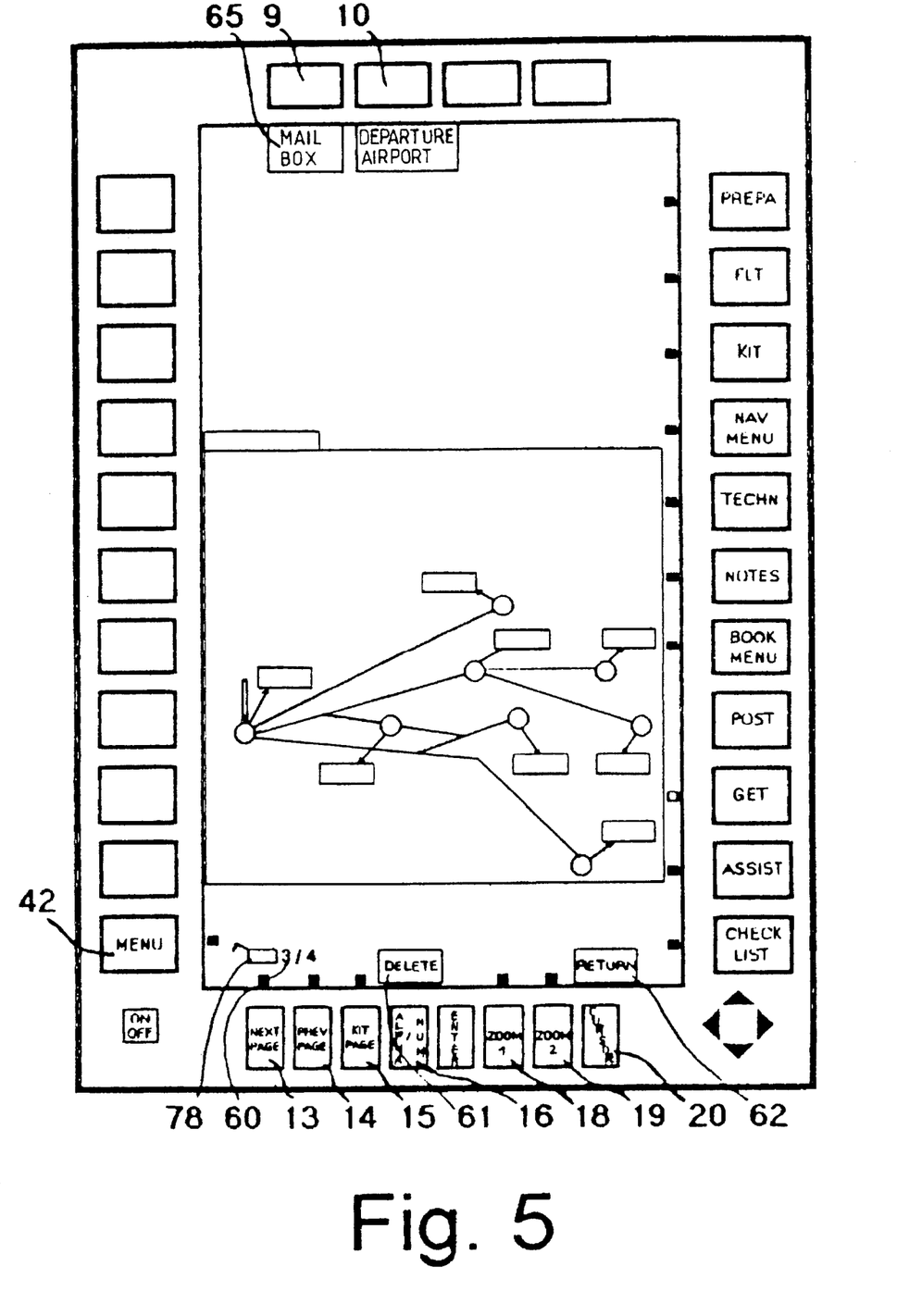

For a system including several terminals, it is possible to select a page on one terminal and place it in another subdivision known as a "mail box" to be placed at the disposal of the other terminals. This enables the user to prepare a document intended for another user. So as to place a document in this subdivision, it merely suffices to press the available key "POST" 28. At this moment, this key becomes active and on all the terminals of the system, the key "GET" 29 allowing for displaying the contents of this subdivision becomes activatable and a special symbol 78 appears on all the screens (FIG. 5). The active key "POST" 28 becomes available when the page stored there is no longer displayed on the screen and nonactivatable if this page is redisplayed.

This function is particularly advantageous within the context of a crew operation when one member of said crew carries out piloting whereas another assists him in his task.

So as to display the contents of this subdivision, it merely suffices to press the key "GET" 29 which moves from the activatable to the active state. The last page inserted in this subdivision then appears on the screen, as well as the number of this page and the number of pages stored 60 (FIG. 5).

Above the screen, the first lefthand key 9 entitled "MAIL BOX" 65 indicates that the contents of the "MAIL BOX" subdivision is being displayed.

Another program makes it possible to assist the crew during the entire flight by informing it of the tasks to be carried out during each piloting stage. So as to activate this program, it merely suffices to press the key "CHECK LIST" 31 which is active or continuously activatable according to the color of its state indicator 46 associated with it (for example, on the screen of FIG. 2).

Figure 6:
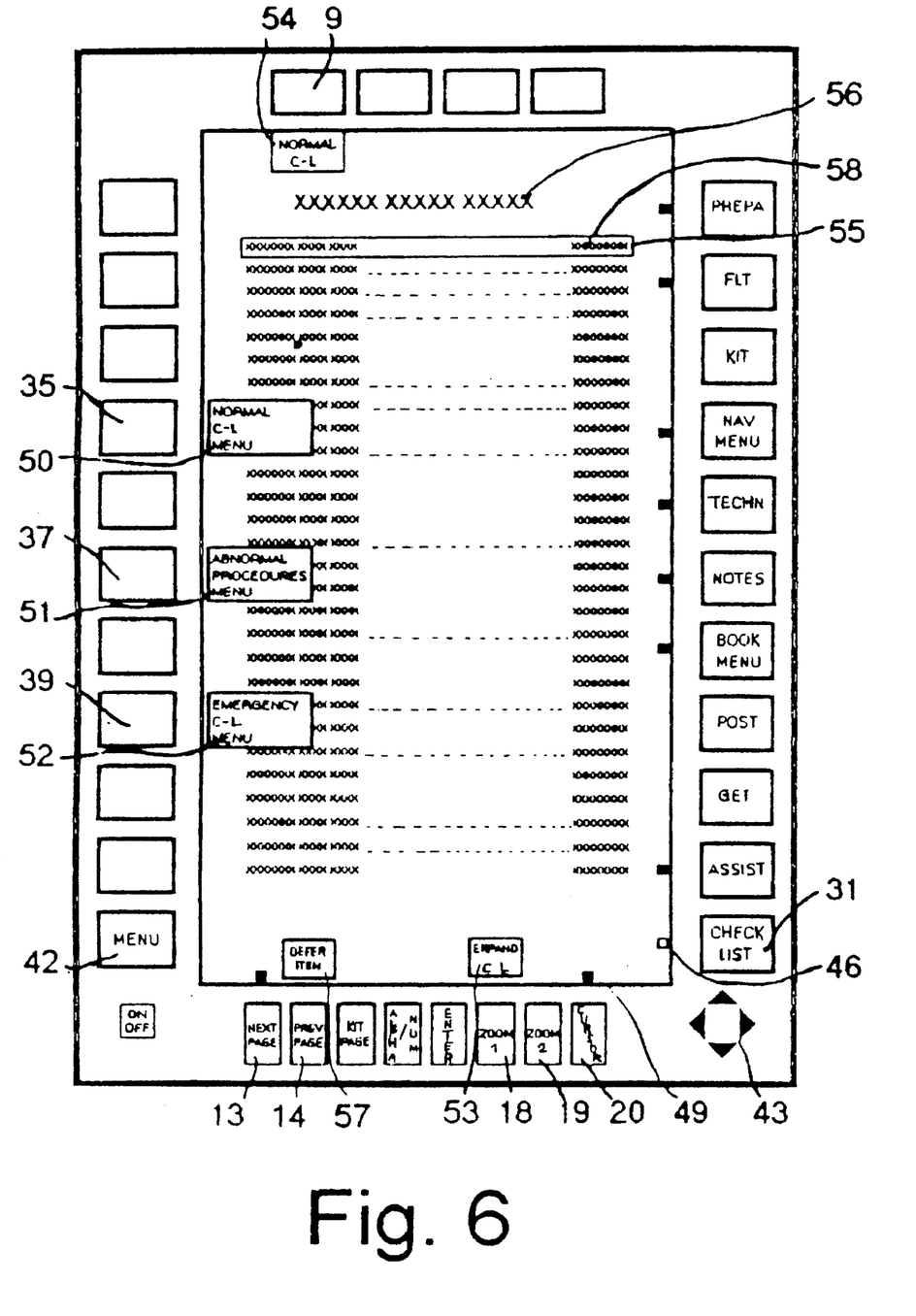

The list of tasks of the current flight phase then appears on the screen (FIG. 6). This is represented by a title 56 which may possibly be "PRIOR TO START UP OF ENGINES" which corresponds to the tasks to be carried out prior to engine start up. This title is followed by the wording 58 on one line of each task to be successively carried out during the current flight phase. The indicator 46 associated with the key "CHECK LIST" 31 has become active (represented by a white square) indicating that the associated function is being processed.

Three keys 35,37,39 of the lefthand column of the screen are activatable and their function, respectively 50,51,52, appears overprinted close to these keys. They make it possible to gain access to the selection menus of the other lists, each key corresponding to a type of list, namely:

"NORMAL C-L MENU" 50 allowing for access to be gained to the other normal lists;

"ABNORMAL PROCEDURES MENU" 51 allowing for access to be gained to the abnormal procedures;

"EMERGENCY C-L MENU" 52 allowing for access to be gained to the emergency lists.

If, for example, the operator activates the key 35 when it is configured as "NORMAL C-L MENU" 50, a new page is displayed on the screen corresponding to the first of those pages granting access to the set of normal lists whose presentation is adapted to the context in which the aircraft is located. An index making it possible to designate a list appears in the form of a frame surrounding the title of either the list being processed if it exists, or the first list. This index may be moved by means of the displacement key 43, the four directions being activatable. When two list titles are displayed on the same line, this means that the two lists correspond to the same flight phase. In this case, the selection of one of these two lists is made by the operator or automatically by the system according to the context of the aircraft at the end of processing the preceding list.

So as to display all the titles of the normal lists, it merely suffices to press the keys "NEXT PAGE" 13 and "PREV. PAGE" 14 to respectively display the next and preceding pages. These keys are only activatable when the triggered operation is able to be executed: for example, the key "PREV. PAGE" 14 to display the preceding page is not activable if the page displayed is the first of the list.

So as to validate a selection, it merely suffices to press the activatable key "ENTER" 17 and the selected list appears on the screen. The key 9 entitled "NORMAL C-L" 62 indicates that the list of the normal lists is present on the screen. In this state, the selection menu of a type of list 50,51,52 is still accessible, but it then only grants access to the abnormal procedures 51 and the emergency lists 52.

When the list corresponding to the current flight phase is displayed, the key "CURSOR" 20 is associated with an activatable indicator 49 and makes it possible to have appear a line index 55 represented by a frame surrounding the wording of the first task to be carried out from the list (FIG. 6). If this key is activated, the key 9 entitled "NORMAL C-L" 54 to indicate that the displayed list is a "normal" type list becomes "CURRENT C-L" so as to indicate that a list of tasks is being processed. This operation also result in the disappearance of the menu 50,51,52 which was displayed overprinted. However, it is possible to redisplay it by activating the key "MENU" 42 indicated as being activatable.

The movement of the index 55 on the various tasks of the list is ordered with the aid of the displacement key 43, only the displacement order towards the bottom being activatable. The activation of this key makes it possible to inform the system that the task designated by the index has been completed, this having the effect of validating this task and positioning the cursor onto the next task. This is the only movement authorized for the index. Moreover, a temporization makes it possible to avoid a line skip occurring inadvertently.

This management of the cursor 55 makes it possible to guarantee that all the tasks present in a list have been executed.

The activatable key "NEXT PAGE" 13 makes it possible to gain access to firstly the continuation of the list if it has not been fully displayed, and then the next normal list. The key "CHECK LIST" 31 makes it possible to at any time display the portion of the list of tasks where the index 55 is located.

The key "ZOOM 1" 18 is reconfigured into "EXPAND C-L" 53 and makes it possible to display on another page the comments associated with the current list. If the operator presses this key "ZOOM 1" 18, a new page is displayed on the screen comprising the title of the previously displayed list and its tasks' wordings, as well as the comments inserted between the title and the first task wording and after each wording. These comments provide additional information concerning firstly the list in general and secondly each task of the list. In this state, the operator has the possibility of displaying the next and preceding pages granting access to the set of comments associated with this list, respectively by means of the keys "NEXT PAGE" 13 and "PREV. PAGE" 14. If the first page of the comments of the list is displayed, only the key "NEXT PAGE" 13 is activatable. The operator is also able to enlarge one portion of the screen by pressing the keys "ZOOM 1" 18 and "ZOOM 2" 19 which have become activatable. If the key 18 is activated when the list being processed is present on the screen and if all the comments of the list are not contained in a page screen, the page displayed contains as a priority the title of the list and the associated comments and then the wording of the task being processed and its comments.

The first key 9 of the upper row has then becomes "EXPANDED C-L" 59 indicating that the page displayed is a list of tasks containing comments. The activatable key "ENTER" 17 makes it possible to go back to the preceding screen (FIG. 6).

Generally speaking, when the index 55 designating the task currently being executed is not present on the screen, it merely suffices to activate the key "CHECK LIST" 31. This key makes it possible to display the current list and overprint the selection menu of another type of list 50,51,52, regardless of the page present on the screen.

When the operator has activated the displacement key 43, with the index 5 being positioned on the final task of the list, the processing of the current list is then completed and the title of the next list appears on the screen framed by the index 55. If the displacement key 43 is re-activated, the list of tasks corresponding to the next piloting phase then appears on the screen. Sometimes, two lists of tasks correspond to the same piloting phase. In this case, if the context managed by the central processing unit allows a selection to be made between these two lists, the selected list appears on the screen. If the central processing unit is unable to decide on which list is to be executed, a selection menu is submitted to the operator and the list selected via this menu is then displayed.

Figure 7:
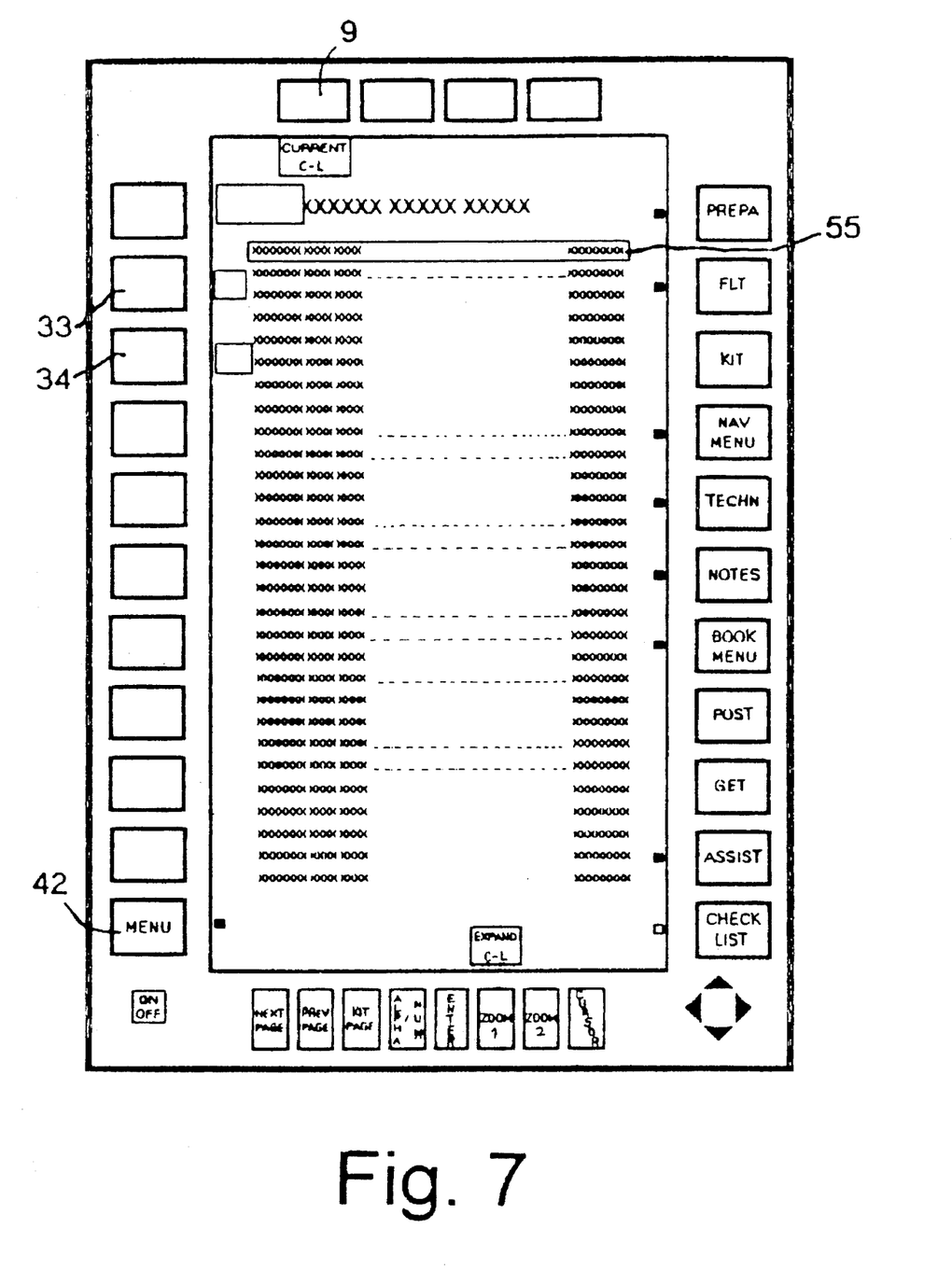

On the screen represented on FIG. 6, the key "PREV. PAGE" 14 has been reconfigured in order to be entitled "DEFER ITEM" 57. If this key is activated, the processing of the task designated by the index 55 is deferred and the index shall frame the wording of the next task (FIG. 7). At this moment, the operator is asked to confirm the defer of the task designated by the index 55. To this effect, the keys 33,34 entitled "YES" and "NO" make it possible to validate or non-validate this defer.

If the operator finally decides not to defer the task designated by the index, he activates the key "NO" 34 and the screen reassumes the preceding aspect (FIG. 6) as if the key 14 reconfigured to "DEFER ITEM" had never been activated.

Figure 8:
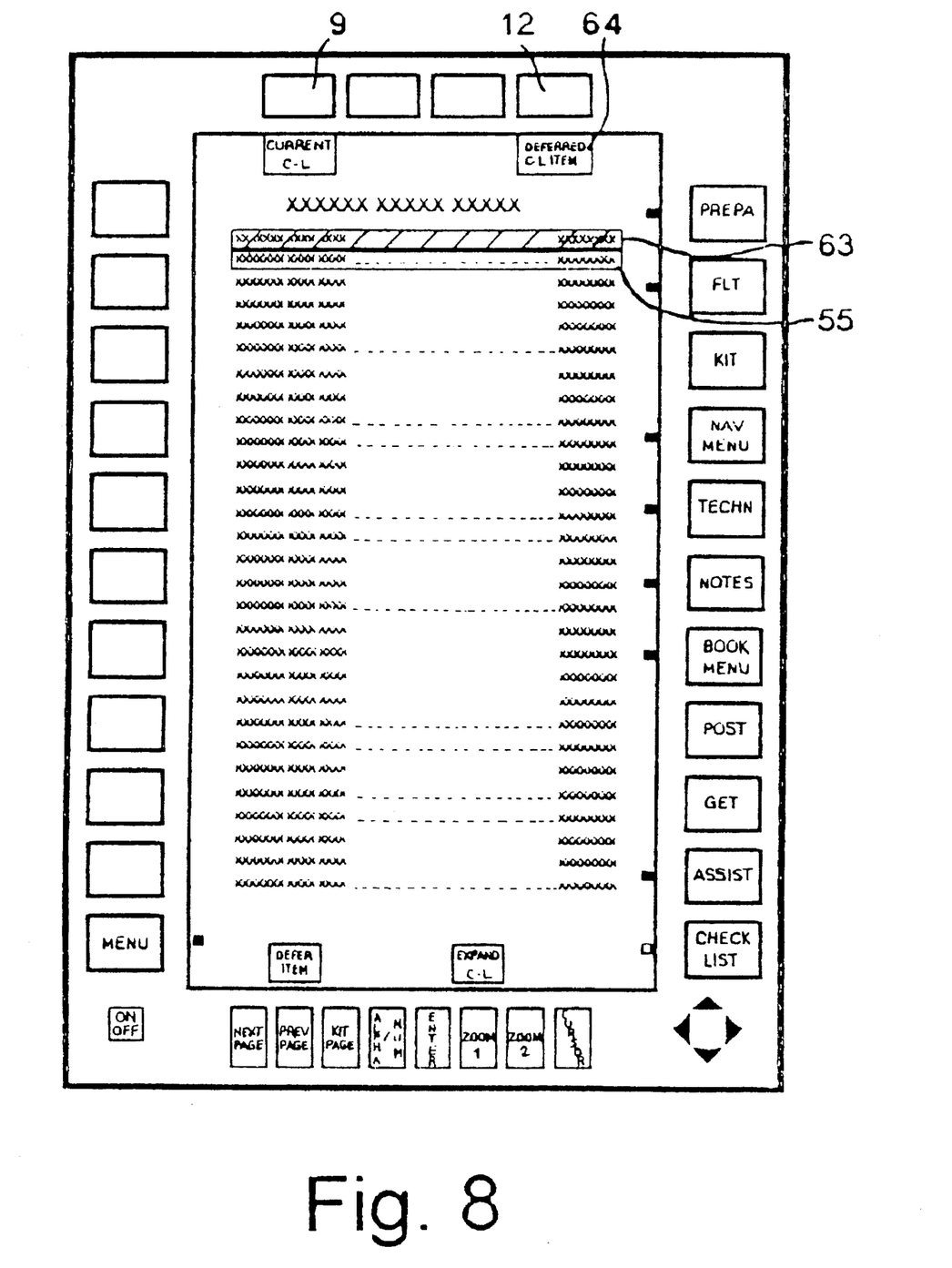

On the other hand, if the operator activates the key 33 entitled "YES" to confirm his request for task execution deferred, as shown on FIG. 8, the line containing the wording of the deferred task remains marked, but this time by a full frame 63 (shown by the hatching) and the index 55 is positioned on the next task. The key 12 then takes up the denomination "DEFERRED C-L ITEM" 65 indicating that at least one task has been deferred and the processing of the list may then be continued as previously described.

At a strategic moment during the course of the flight, a mesage may be given to the operator and displayed at the bottom of the screen asking him to execute the deferred tasks. This means that at this moment, so as to continue processing the lists of tasks, the deferred tasks need to be firstly executed and validated. The displacement key of the index 43 is then disactivated. In fact, the safety instructions require that all the actions be accomplished at precise moments and especially prior to undertaking certain flight phases (running, lift-off, landing).

So as to ensure that the displacement key 43 is again activatable, the key 12 entitled "DEFERRED C-L ITEM" needs to be activated which has the effect of making the page containing the first deferred task appear. An action on the displacement key 43 makes it possible to have disappear one after the other and in the order they appear in the lists those markers 63 surrounding the carried tasks for the purpose of validating them.

When all the deferred tasks are validated, the title "DEFERRED C-L ITEM" 64 disappears and the key 12 becomes inoperative. The sequencing of the lists is then restored, thus rendering it possible to display and process the next list.

This defer function introduces more flexibility into the method described above whilst guaranteeing that all the tasks are executed before starting a critical flight phase.

On the other hand, when the operator interrupts the processing of a list so as to activate another main function of the terminal, the state indicator 46 of the key "CHECK LIST" 31 flashes slowly to remind him that the processing of a list is not finished.

Figure 9:
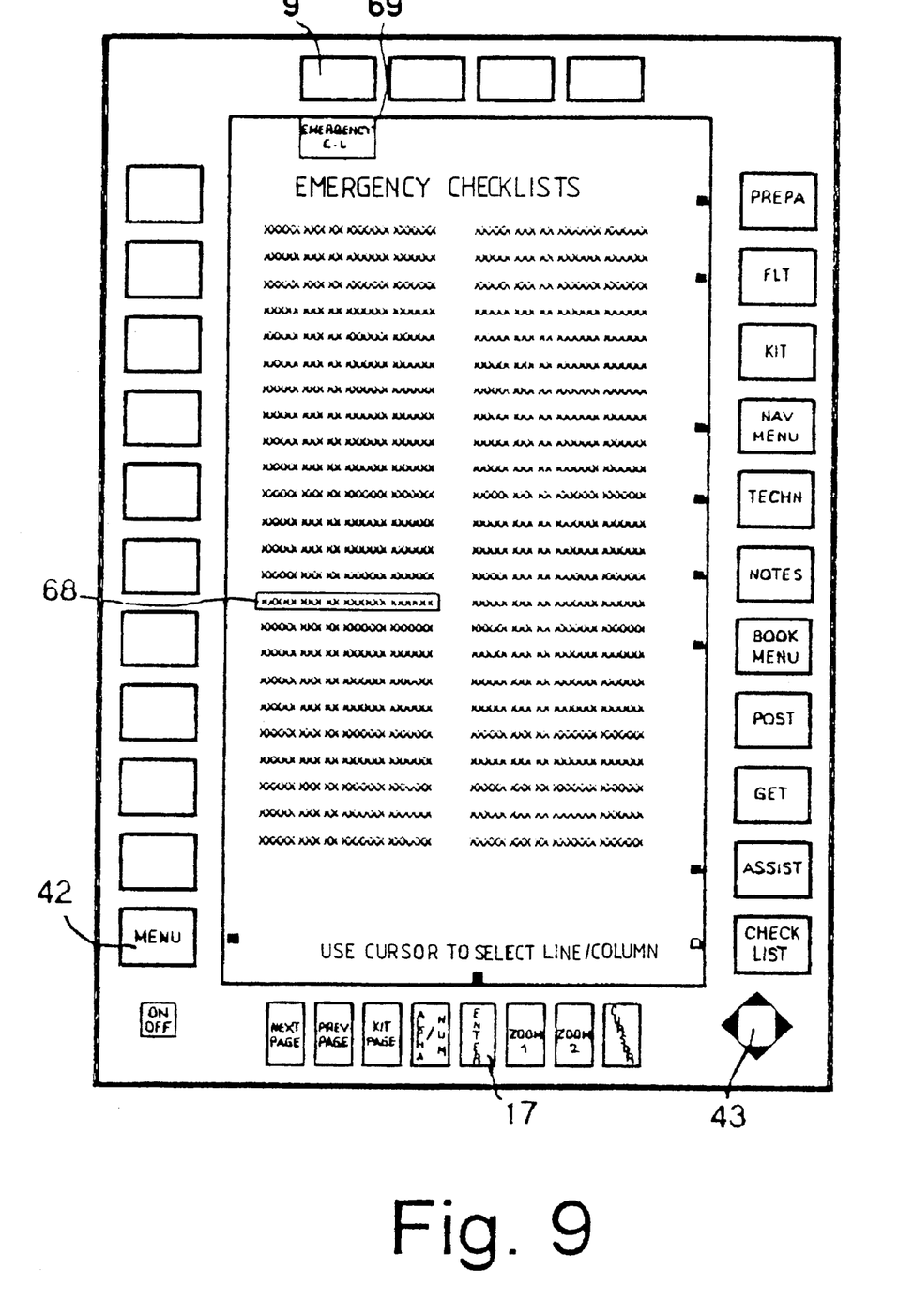

Furthermore, when the central processing unit 2 receives an abnormal event corresponding, for example, to a malfunction, of one of the other items of the embarked electronic equipment, an arrow 66 pointing onto the key "CHECK LIST" 31 is displayed on the screen (FIG. 4). The purpose of this arrow is to induce the operator to press on this key. If in this state the key "CHECK LIST" 31 is activated, the screen shown on FIG. 9 appears. This screen represents the list of the titles of the lists of urgent tasks and an index 68 is prepositioned on the title of the list to be executed so as to correctly react to the malfunction. This disposition makes it possible to inform the operator of the list best adapted to the context, whilst allowing him the choice of selecting another list by means of the displacement key 43. When the operator presses on the key "ENTER" 17, the selected list appears on the screen so as to be able to be processed in the same way as the list shown on FIG. 6. However, at the end of processing of the list, the central processing unit 2 is able to chain other lists of tasks according to the change of this abnormal situation. By means of these dispositions, the lists of urgent tasks are rapidly accessible independent of their frequency of use by taking account of the context of the flight.

What is claimed is:

1. A method for assisting the piloting of an aerodyne and implemented by a system including a processor, at least one man/machine communication terminal comprising a display screen and control and data entry keys and memories where are stored in particular all data useful to operating a flight and that required to conduct a flight in accordance with air regulations, the system being connected to other items of electronic equipment embarked on the aerodyne, wherein said method includes the following stages:

entering and classifying said data in the memories in the form of a data base in which links are established between each of possible contexts of said aerodyne and data most suitably adapted to said context, each of said links being associated with an order of relevance with respect to the linked context, the operator being provided by the terminal with first means for exploiting these data;

acquiring in real time by said processor all data sent by said other items of electronic equipment, said sent data determining a current context of said aerodyne;

preselecting by said processor from the data base the data which are linked to the current context and classifying said preselected data by using said orders of relevance associated with said links;

providing the operator through said terminal with second means for exploiting the preselected classified data;

selecting by the operator one of the exploitation means and one portion of said preselected data; and exploiting on the display screen by the operator the portion of the preselected data with the aid of the selected exploitation means.

2. The method according to claim 1, wherein the data base includes a plurality of lists of tasks, each list indicating for a specific aerodyne context all the tasks to be carried out and their sequencing, said method including:

preselecting a list of tasks which is linked to the current context through a link associated with a highest order of relevance with respect to the current context of the aerodyne, activating by the operator a first exploitation means for:
displaying the preselected list by the processor on the screen of said terminal, activating by the processor a first key for positioning a marker which designates the first task to be carried out from the list displayed on the screen, thus provoking the launching of processing of the list, and processing the list during which said marker is moved from one task to another and during which the operator has to press a second key of said terminal so as to validate the task designated by said marker when the latter is executed, the marker then designating the next task.

3. The method according to claim 2, wherein the displaying of the preselected list of tasks is triggered by a third key of said terminal, said key in an active state enabling the operator to again display the current list if processing of said current list has been interrupted so as to activate another exploitation means.

4. The method according to claim 3, further comprising displaying a special indicator close to the third key for inducing the operator to trigger the displaying of this list of tasks when an abnormal event has occurred.

5. The method according to claim 2, further comprising displaying detailed comments concerning the list of tasks present on the display screen, said display being triggered by a fourth key of said terminal.

6. The method according to claim 2, further comprising deferring execution of the task designated by said marker, triggered by a fifth key of said terminal, said deferring consisting of moving said marker so as to designate the next task, displaying another marker marking said deferred task, and simultaneously rendering activatable a sixth key so as to allow for validation of all the deferred tasks one after the other and according to the order in which the deferred tasks have been deferred.

7. The method according to claim 6, wherein the processing of a list of tasks may be blocked by the processor when the current context of the aerodyne requires that all the deferred tasks be executed and when at least one task has been deferred.

8. The method according to claim 2, wherein when at page is displayed on the screen of said terminal a state indicator is associated with the third key so as to indicate at any moment whether or not a list of tasks is currently being processed, irrespective of said page.

9. The method according to claim 1, further comprising the following stages:

initializing a context of the flight and consisting of entering, by means of said terminal, airport references for designating a departure airport, a destination airport and possibly an alternate airport;

preselecting by the processor sets of data concerning said airports;

activating by the operator a second exploitation means for:
selecting by the operator one of said airports;
displaying on said display screen by the processor a list of titles of the preselected sets of data concerning the selected airport, thus enabling the operator to select the set he wishes to consult;
selecting by the operator a set to be consulted;
displaying on said display screen page by page by the system the selected set with possibility for the operator of displaying next and preceding pages and again display the list of the titles of the sets so as to allow for displaying another set.

10. The method according to claim 1, further comprising activating by the operator a third exploitation means for storing as ordered by the operator a page displayed on the screen inside an easily and quickly accessible memory space.

11. The method according to claim 10, wherein said memory space includes several subdivisions, one first subdivision being allocated to the departure airport, a second to the destination airport and a third to the alternate airport.

12. The method according to claim 11, wherein said system includes several terminals, said memory space including other subdivisions allocated to any page and respectively associated with the terminals.

13. The method according to claim 12, wherein the storing of the page displayed on the screen of one terminal of said terminals in one of said first, second and third subdivisions or in the subdivision associated with said one terminal depends on the contents of said page and is triggered by a seventh key of said one terminal.

14. The method according to claim 12, further comprising storing a page displayed on the screen in the subdivision associated with the terminal when said page does not concern any of said airports, said storage being triggered by a seventh key of the terminal.

15. The method according to claim 12, further comprising displaying on the screen of one of the terminals the contents of said first, second and third subdivisions and the specific subdivision of the terminal, this display being triggered by an eighth key of said terminal, the displaying of the contents of the subdivisions respectively associated with the other terminals not being authorized.

16. The method according to claim 15, wherein during said displaying the contents of a subdivision is presented by order of decreasing relevance with respect to the current context.

17. The method according to claim 15, further comprising, at the same time as displaying on the screen a page stored in a subdivision, allocating said seventh key for suppressing said page from the subdivision where said page is stored until a page is displayed which is not already stored in a subdivision so as to prohibit the storing of the same page more than once.

18. The method according to claim 11, further comprising storing a page displayed on the screen in a fourth subdivision allocated to any page, said storing being triggered by a ninth key of said terminal.

19. The method according to claim 18, further comprising displaying on any of the terminals of the contents of the fourth subdivision, said display being triggered by a tenth key of said terminal.

20. A device for assisting the piloting of an aerodyne, comprising:

a processor connected to other items of electronic equipment embarked on the aerodyne for acquiring in real time data relating to a current context of the aerodyne, at least one man/machine communication terminal connected to the processor and comprising a display screen and control and data entry keys, and memories accessible by the processor where all data useful and required to conduct a flight in accordance with air regulations is stored in the form of a data base in which links are established between each of possible contexts of said aerodyne and data most suitably adapted to said context, each of said links being associated with an order of relevance with respect to the linked context, the processor including:
  first means for exploiting the data of the data base,
  means for storing and updating said data related to the current context of the aerodyne,
  means for preselecting in the data base the data which are linked to said current context and for classifying said preselected data by using said orders of relevance associated with said links,
  second means for exploiting the classified preselected data.

21. A man/machine communication terminal for assisting the piloting of an aerodyne, connected to a system comprising:
  a processor connected to other items of electronic equipment embarked on the aerodyne for acquiring in real time data relating to a current context of the aerodyne,
  memories accessible by the processor where in particular all the information useful for the conducting of a flight and data useful and required to conduct a flight in accordance with air regulations is stored in the form of a data base in which links are established between each of possible contexts of said aerodyne and data most suitably adapted to said context, each of said links being associated with an order of relevance with respect to the linked context,
  the processor including:
    first means for exploiting the data of the data base,
    means for storing and updating said data related to the current context of the aerodyne,
    means for preselecting in the data base the data which linked to said current context, and means for classifying said preselected data by using said orders of relevance associated with said links, and
    second means for exploiting the classified preselected data,
  wherein said terminal comprises a display screen and keys for entering information and carrying out commands, said keys being divided at the periphery of the screen into four sets of successive keys, a first set being allocated to activation of the exploitation means, a second set to carry out selections when a menu is displayed on the screen, a third set being allocated to management functions of the terminal, and a fourth set to display last selections made by the operator and reactivate said last selections, said keys being reconfigurable according to a page displayed on the screen and each being associated with an adjacent zone of the screen where the function allocated to it is displayed.

22. The terminal according to claim 21, wherein each of said keys is associated with a status and a status indicator displayed on the screen, said status having a value equal to active, activatable or non activatable which corresponds to a state of a function triggered by the key.

23. The terminal according to claim 22, wherein the keys allowing for displaying of the final selections are respectively associated with one zone of the screen where wordings of these selections are featured, the key associated with the final selection being non activatable and the others keys associated with the final selections being activatable for displaying the last page displayed concerning the corresponding selection.

24. The terminal according to claim 21, wherein said display screen includes four edges along which said four sets of keys are respectively disposed.

25. The terminal according to claim 21, further comprising a key for displaying a previously selected menu.

* * * * *